UNITED STATES PATENT OFFICE.

FRANZ VON KÜGELGEN AND GEORGE O. SEWARD, OF HOLCOMBS ROCK, VIRGINIA, ASSIGNORS, BY MESNE ASSIGNMENTS, TO TIN PRODUCTS COMPANY, A CORPORATION OF NEW YORK.

PROCESS OF DETINNING.

No. 851,946.          Specification of Letters Patent.          Patented April 30, 1907.

Application filed August 4, 1905. Renewed March 30, 1907. Serial No. 365,603

*To all whom it may concern:*

Be it known that we, FRANZ VON KÜGELGEN, a subject of the German Emperor, and GEORGE O. SEWARD, a citizen of the United States, both residing at Holcombs Rock, in the county of Bedford and State of Virginia, have jointly invented certain new and useful Improvements in Processes of Detinning, of which the following is a specification.

This invention aims to economically recover the tin from tin scrap.

In our application No. 189,272, filed January 16, 1904, we have described a process of detinning wherein the scrap is placed in a vessel and dry chlorin is admitted thereto, attacking the tin and forming stannic chlorid, which is condensed upon the walls of the vessel. It is essential to the success of this process that the temperature be carefully controlled and maintained within narrow limits. The reaction is attended by generation of heat, so that the temperature rises rapidly. The temperature must always be kept below the point at which iron-chlorid is formed. If, however, to avoid this result the temperature is kept too low, the detinning is slow and not so complete as it should be. In order to secure a good practical result, it is advisable to keep the temperature as high as possible, but always below the temperature at which the iron is attacked. In our said application we have described a means of avoiding the objectionable overheating, while keeping the temperature high enough for efficiency; namely, by limiting the amount of chlorin introduced, the inflow of chlorin being varied according to the temperature, so as to keep the heat up near to, but always below, the prohibitive point. Auxiliary to this is the external cooling of the vessel, as by the application of a water jacket, which hastens the process and gives further control of the temperature.

Our present invention provides another means of keeping the temperature within control; namely, by limiting the amount of tin scrap proportionally to the volume of the vessel or reaction chamber. Thus we control the reaction, and consequently the heat of reaction, by limiting the proportion of tin, instead of by limiting the proportion of chlorin. We also apply by preference external cooling, as by a water jacket.

In practicing our invention we put a relatively small quantity of tin scrap into a chamber of given size, and introduce dry chlorin thereinto without limit. Even though the chlorin is present in volume much in excess of the reactive proportion, the heat generated by the reaction is dissipated through the contents of the tank, which keeps down the temperature. It is impossible to lay down any definite limits of proportion for the successful practice of our invention, but with a chamber of 40 cubic feet capacity, a charge of 150 pounds of tin scrap has given successful results.

The resulting stannic chlorid may be removed by the means set forth in our said application, or in various other ways.

Another way of controlling the temperature so that the iron is not attacked is as follows:—Instead of limiting the amount of chlorin or amount of scrap used in a vessel of a given size, we use at once such a powerful current of chlorin that the same is present in great excess above the reactive proportion. Chlorin is now passed through in such a large volume that the current of cool gas flowing through the detinning tank exerts a cooling action on the contents. The heat of the reaction is carried away by the stream of chlorin and the temperature is thus kept so low that the iron of the scrap is not attacked.

We claim as our invention:—

1. The recovery of tin from tin scrap by treating the latter in a closed vessel with dry chlorin to form stannic chlorid, and so limiting the quantity of scrap that the heat generated by the reaction is absorbed by the contents of the vessel and the temperature prevented from rising to a point at which the iron is attacked.

2. The recovery of tin from tin scrap by treating the latter in a closed vessel with dry chlorin to form stannic chlorid, so limiting the quantity of scrap that the heat generated by the reaction is absorbed by the contents of the vessel, and water-cooling the vessel, whereby the temperature is kept below that at which the iron is attacked.

3. The recovery of tin from tin scrap by treating the latter in a closed vessel with dry chlorin to form stannic chlorid, and passing through the vessel such a surplus of chlorin above the amount necessary for the reaction that the heat generated by the reaction is absorbed by the large amount of cool gas and the temperature thereby kept below the point at which the iron is attacked.

In witness whereof, we have hereunto signed our names in the presence of two subscribing witnesses.

FRANZ VON KÜGELGEN.
GEORGE O. SEWARD.

Witnesses:
   Geo. T. Lancaster,
   Fr. v. Kidder.